United States Patent [19]

Takagi et al.

[11] Patent Number: 4,875,647

[45] Date of Patent: Oct. 24, 1989

[54] CABLE TIE

[75] Inventors: Akira Takagi; Hirotsugu Oyaizu; Nobuatsu Takahashi; Kiyotaka Kume, all of Okazaki, Japan

[73] Assignee: Daiwa Kasei Kogyo Kabushiki Kausha, Okazaki, Japan

[21] Appl. No.: 184,586

[22] Filed: Apr. 21, 1988

[30] Foreign Application Priority Data

Apr. 24, 1987 [JP] Japan .............. 62-63330[U]
Apr. 24, 1987 [JP] Japan .............. 62-63331[U]
May 28, 1987 [JP] Japan .............. 62-81787[U]

[51] Int. Cl.⁴ .............................. F16L 3/08
[52] U.S. Cl. .................. 248/74.3; 24/16 PB; 24/19; 24/274 R
[58] Field of Search .......... 248/74.3; 24/16 PB, 24/16 R, 30.5 P, 19, 269, 274 R

[56] References Cited

U.S. PATENT DOCUMENTS

| | | | |
|---|---|---|---|
| 2,977,145 | 3/1961 | Rifkin | 24/16 PB |
| 3,118,473 | 1/1964 | Bell | 24/16 PB |
| 3,471,109 | 10/1969 | Meyer | 24/16 PB |
| 4,501,049 | 2/1985 | Adamson | 24/30.5 P |
| 4,510,650 | 4/1985 | Espinoza | 24/274 R |
| 4,537,432 | 8/1985 | Meeks | 24/16 PB |
| 4,547,980 | 10/1985 | Olivieri | 24/269 X |
| 4,735,387 | 4/1988 | Hirano et al. | 24/16 PB |

FOREIGN PATENT DOCUMENTS

| | | | |
|---|---|---|---|
| 2274518 | 1/1976 | France | 24/16 PB |
| 516032 | 12/1939 | United Kingdom | 24/19 |

Primary Examiner—Alvin C. Chin-Shue
Assistant Examiner—David L. Talbott
Attorney, Agent, or Firm—Dennison, Meserole, Pollack & Scheiner

[57] ABSTRACT

A cable tie includes an elongated strap and a buckle connected to one end of the strap and having an aperture for receiving the other end of the strap. Preferably, the strap has adjacent the buckle a connecting portion which has a width less than that of the remaining portion of the strap. In an alternative form of the invention, the strap has a plurality of spaced-apart projections formed on and extending longitudinally on the opposite side surfaces thereof except a connecting portion adjacent the buckle. In a further modification of the invention, the strap has a series of ridges formed on and extending longitudinally on a bundle engaging surface. The ridges are adapted to prevent slipping movements between the strap and the bundle in both longitudinal and circumferential directions of the bundle of wires or the like.

6 Claims, 9 Drawing Sheets

CABLE TIE

BACKGROUND OF THE INVENTION

1. Field of the Invention

The present invention relates to a cable tie to be tightened around a bundle of wires or the like.

2. Description of the Prior Art

Figure 30:
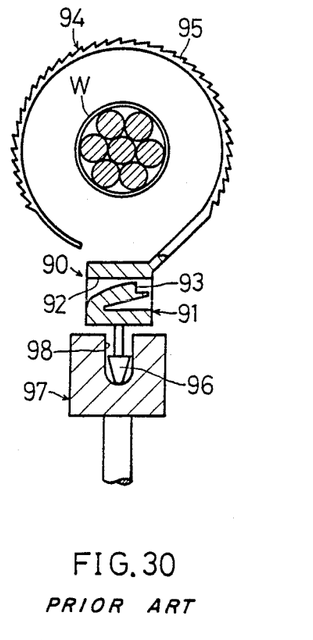
FIG. 30 is a schematic view of a conventional cable tie.

In general, cable ties are used to tighten a bundle of wires. Such cable ties are sometimes used to install the bundle of wires to a vehicle body or the like. FIG. 30 shows a conventional cable tie 90 used in the art. The cable tie 90 has an elongated strap 94 terminating at one end in a buckle 91. The buckle 91 has an aperture 92 for admitting the other end of the strap 94 thereinto and a ledge 93 disposed within the aperture 92. The strap 94 has on one surface thereof a plurality of pawls 95 engageable with the ledge 93. The buckle 91 has an leg 96 resiliently engageable with a mounting hole 98 of a tie installation tool 97. In applying the tie 90 to a bundle W of wires, the leg 96 is inserted in the mounting hole 98 of the tie installation tool 97 to temporarily secure the tie 90. The strap 94 is then looped around the bundle W of wires, and the other end of the strap 94 is made to pass through the aperture 92. Thereafter, tension is applied to the strap 94, as by a manual tightening tool, to pull it through the aperture 92 and tight around the bundle W of wires.

However, with such a cable tie, the operation of inserting the other end of the strap 94 into the aperture 92 is performed with the bundle W of wires placed on the buckle 91. The inserting operation has to be performed by touch, making the tying operation cumbersome. Further, as the leg 96 is temporarily locked in the hole 98 of the tie installation tool 97, the tie 90 tends to be inclined during tying operation. For this reason, when a plurality of the ties 90 are fixed to the bundle W of wires at predetermined intervals, it is sometimes difficult to make uniform the orientation of the legs 96. Thus, the mounting operation of the legs 96 to mounting holes of a vehicle body may be delayed.

SUMMARY OF THE INVENTION

It is, accordingly, an object of the present invention to provide an improved cable tie for a bundle of wires or the like which eliminates the aforenoted disadvantages.

It is another object of the present invention to provide a cable tie which is well adapted to be tightened by a tensioning device having an automatic feeding mechanism.

It is a further object of the present invention to provide a cable tie in which a locking leg may be oriented to a constant direction with respect to a bundle of wires or the like to be tightened.

It is a still further object of the present invention to provide such a cable tie which may be snuggly looped around a bundle of wires or the like and locked in place, without causing slipping movements thereof in both longitudinal and circumferential directions of the bundle of wires or the like.

According to the present invention, there is provided a cable tie adapted to be tightened around a bundle of wires or the like by a tensioning device. The cable tie includes an elongated strap and a buckle connected to one end of the strap and having an aperture for receiving the other end of the strap. The strap has a series of teeth formed on and extending longitudinally on one surface thereof which will be outside when the tie is tightened around the bundle of wires of the like. The buckle has a pawl disposed within the strap receiving aperture and engageable with one of the teeth of the strap.

Preferably, the strap has adjacent the buckle a connecting portion which has a width less than that of the remaining portion of the strap. In an alternative form of the invention, the strap has a plurality of spaced-apart projections formed on and extending longitudinally on the opposite side surfaces thereof except a connecting portion adjacent the buckle. In a further modification of the invention, the strap has a series of ridges formed on and extending longitudinally on a bundle engaging surface. The ridges are adapted to prevent slipping movements between the strap and the bundle in both longitudinal and circumferential directions of the bundle of wires or the like.

The present invention will become more fully apparent from the claims and description as it proceeds in connection with the drawings.

BRIEF DESCRIPTION OF THE DRAWINGS

FIGS. 18 to 29 are schematic views illustrating various forms of protrusions formed on the inner surface of the strap.

DETAILED DESCRIPTION OF THE PREFERRED EMBODIMENTS

Figure 1:
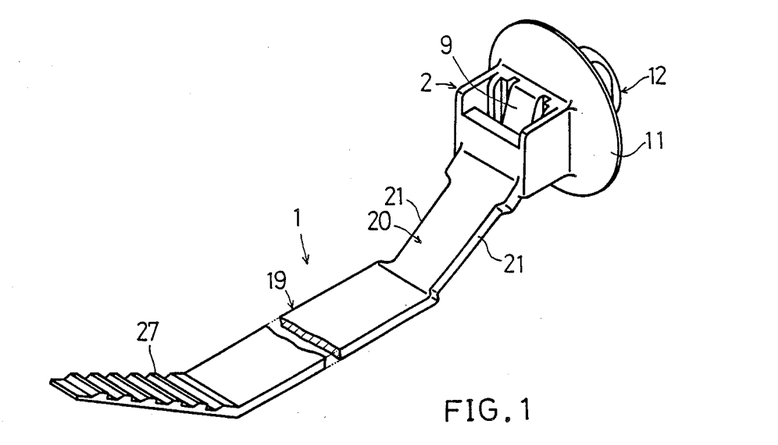
FIG. 1 is a perspective view of a cable tie according to a first embodiment of the present invention.
Figure 2:
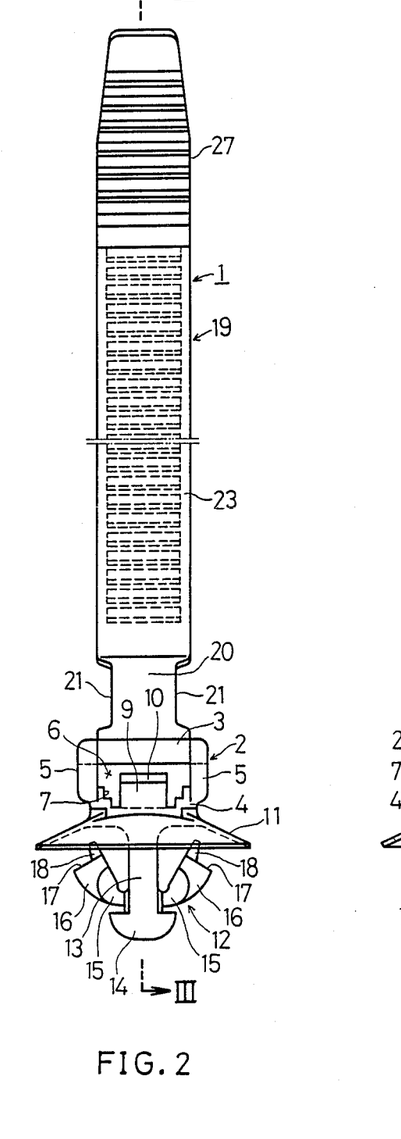
FIG. 2 is a front view of the cable tie shown in FIG. 1.
Figure 3:
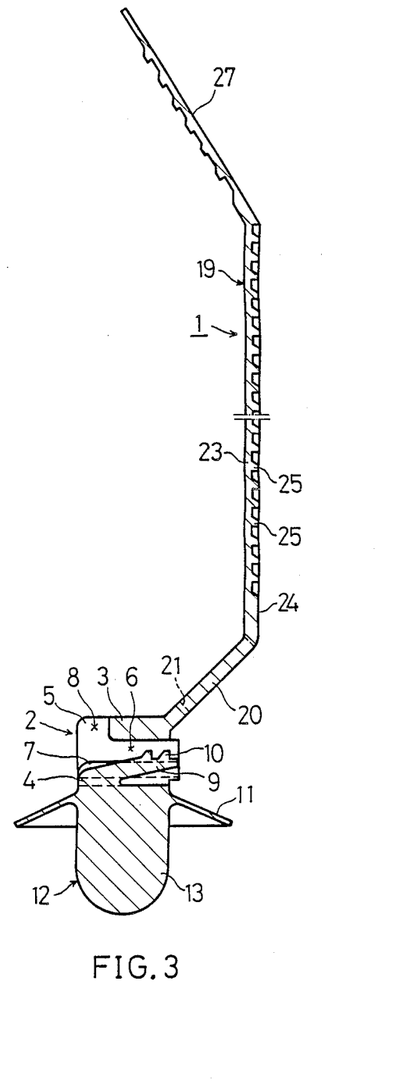
FIG. 3 is a sectional view taken along line III—III of FIG. 2.

Referring now to FIGS. 1 to 3, shown therein is a cable tie 1 in its relaxed state according to a first embodiment of the present invention. As shown therein, the cable tie 1 includes a buckle 2, a locking leg 12, and a strap 19. The cable tie 1 is molded in one piece of a resilient, yet generally shape retaining synthetic plastic material.

Figure 4:
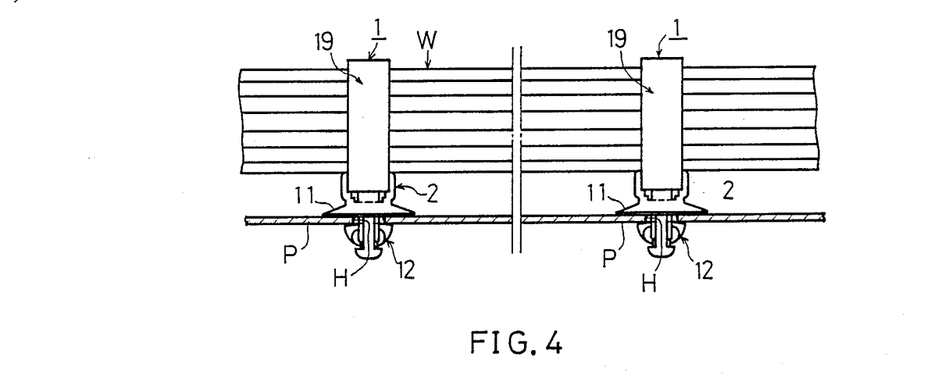
FIG. 4 is a schematic view illustrating the cable ties tightened around a bundle of wires and secured to a vehicle body.

The buckle 2 has an upper member 3, a bottom member 4, and a pair of side members 5; these four members encompass a rectangular aperture 6 through which the strap 19 is passed. Each of the side members 5 has formed inside thereof a guide portion 7 which is adapted to guide the strap 19 toward the upper region of the aperture 6. The upper member 3 has a cutout portion 8 on one side thereof from which the strap 19 is inserted. The bottom member 4 has a resilient engaging member 9 extending at a predetermined angle from the inlet side to the outlet side. The engaging member 9 has a pair of projections 10 formed on the upper rear end thereof. A resilient, umbrella-shaped fence 11 is provided which extends peripherally about the bottom member 4. As shown in FIG. 4, the task of fence 11 is to cover a tie mounting hole H of a vehicle body P when the tie 1 is secured to the body P with a bundle W of wires tightened thereby.

The locking leg 12 has a central leg 13 which is formed into a plate-like configuration for insertion into the tie mounting hole H of the vehicle body P. The tip of the central leg 13 has an engaging block 14 of generally warhead-like configuration. The central leg 13 also has a pair of opposed engaging legs 16 extending obliquely from the lower end thereof through a pair of hinges 15. Each of the engaging legs 16 has an engaging surface 17 and a projection 18. By means of this arrangement, as shown in FIG. 4, the locking leg 12 may be resiliently locked in the tie mounting hole H of the vehicle body P.

The strap 19 extends from the outlet side of the upper member 3 of the buckle 2. The strap 19 has on its base portion a connecting portion 20 extending a predetermined length at an angle of 45°. A band portion 23 of a predetermined width is merged with the connecting portion 20 at an angle of 45°. The connecting portion 20 has a pair of cutout portions 21 formed on the opposite sides thereof. Thus, the width of the connecting portion 20 is less than the width of the band portion 23, such that the connecting portion 20 may pass through a pair of guide rails 35 of a tie tensioning device 30 which will be explained hereinafter.

The band portion 23 extends a predetermined length and has a series of spaced-apart teeth 25 formed on one surface 24 thereof which is an outer surface when the tie 1 is looped around a bundle W of wires (FIG. 4). The teeth 25 are engageable with the projections 10 on the engaging member 9. The end of the band portion 23 is provided with a tapered leading end 27 extending at a predetermined angle therefrom.

Figure 5:
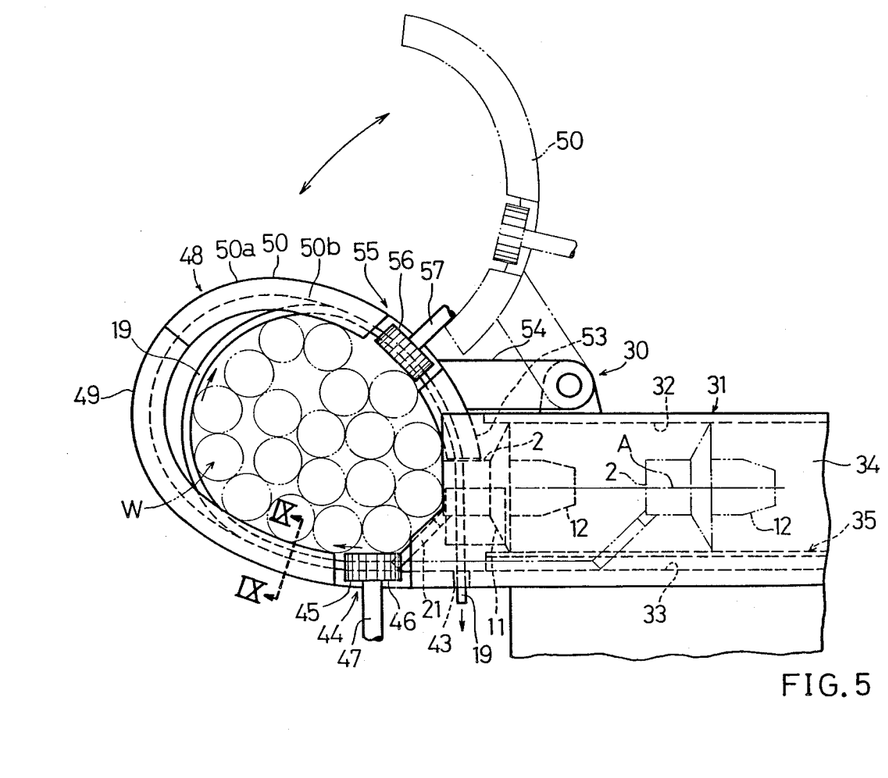
FIG. 5 is a side view of the essential parts of a tie tensioning device to be used with the cable tie.

Now, a tensioning device 30 for tightening the cable tie 1 around a bundle of wires will be described with reference to FIGS. 5 to 9. As shown in FIG. 5, the tensioning device 30 includes a tie guiding mechanism 31, a buckle positioning mechanism 38, a strap feeding mechanism 44, a strap guiding mechanism 48, and a strap tightening mechanism 55.

Figure 7:
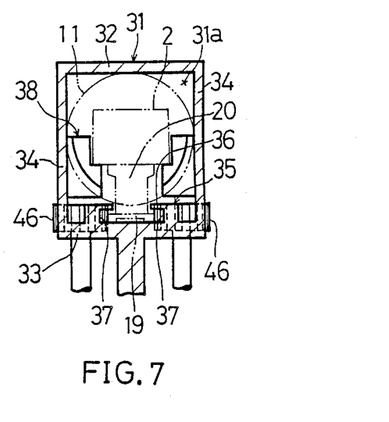
FIG. 7 is a sectional view taken along line VII—VII of FIG. 6.

The tie guiding mechanism 31 has an upper member 32, a lower member 33 and a pair of side members 34; these four members define a substantially square cross-sectional space 31a therein. As shown in FIG. 7, the upper member 32 and the side members 34 are arranged such that the fence 11 of the cable tie 1 may be guided therewithin in an inscribing manner. The lower member 33 has a pair of transversely spaced-apart guide rails 35 extending longitudinaly thereon. Each of the guide rails 35 has a ledge 36 extending inwardly from the upper surface thereof. The guide rails 35 and the lower member 33 defines a pair of opposed grooves 37 through which the band portion 23 may be inserted and guided. It is to be noted that the distance between the ledges 36 is greater than the width of the connecting portion 20 of the strap 19 and is less than the width of the band portion 23.

Figure 6:
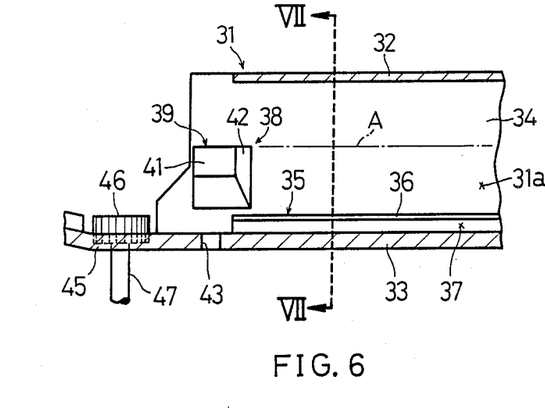
FIG. 6 is a vertical sectional view of the tie guiding mechanism.

In use, the leading end 27 of the cable tie 1 is inserted into the tie guiding mechanism 31 from the right-hand end as viewed in FIGS. 5 and 6. At this time, the band portion 23 is slided longitudinally of the tie guiding mechanism 31 but is restricted by the grooves 37 for both vertical and lateral movements. The strap 19 is further moved until the connecting portion 20 extends upwardly beyond the ledges 36, and the buckle 2 is located on the guide rails 35. The buckle 2 is positioned by the upper member 32, the side members 34 and the guide rails 35, and since the aperture 6 of the buckle 2 extends in a plane perpendicular to the longitudinal extension of the band portion 23, the buckle 2 is moved horizontally along the londitudinal axis of the tie guiding mechanism 31.

Figure 8:
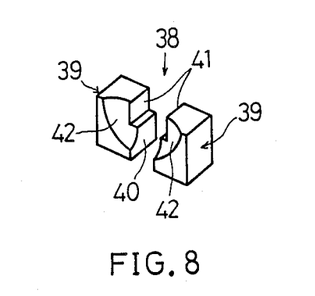
FIG. 8 is a perspective view of the buckle positioning mechanism.

The buckle positioning mechanism 38 is disposed at the outlet side of the tie guiding mechanism 31. Specifically, as shown in FIGS. 7 and 8, the buckle positioning mechanism 38 includes a pair of support members 39 mounted in opposed relation between the side members 34. Each of the support members 39 has an inner surface 40 on which a support surface 41 is formed to support the side member 5 of the buckle 2. The support member 39 also has a curved support surface 42 configured to support a part of the peripheral side surface of the fence 11. Each of the support members 39 is secured to the side member 34 with its upper surface in alignment with the axis A. The distance between the opposite surfaces 40 is such that the band portion 23 can pass therethrough. By means of this arrangement, when the cable tie 1 is fed from the right to the left (as viewed in FIGS. 5 and 6), the buckle 2 will abut on the buckle positioning mechanism 38 to be positioned thereby. As best shown in FIGS. 5 and 6, the lower member 33 has a hole 43 formed in the forward end thereof and located directly below the aperture 6 of the buckle 2 when the latter is held by the buckle positioning mechanism 38. Thus, the strap 19, when inserted into the buckle 2, can pass through the hole 43 to be tightened around the bundle W.

The strap feeding mechanism 44 is disposed adjacent the forward end of the tie guiding mechanism 31. Specifically, as shown in FIGS. 6 and 7, a guide plate 45 extends from the lower member 33 of the tie guiding mechanism 31. The guide plate 45 has a pair of rollers 46 mounted horizontally on the opposite sides thereof. Each of the rollers 46 has on the periphery thereof a plurality of vertical grooves or knurls for frictionally engaging the strap 19. The rollers 46 are mounted on rotary shafts 47 driven by a suitable source of drive and are rotated in opposite directions to feed the strap 19 to the left as viewed in FIGS. 5 and 6. It is to be noted that the arrangement of the guide rails 35 and the feeding mechanism 44 is such that when the tie 1 is fed until the buckle 2 abuts against the buckle positioning mechanism 38, the band portion 23 is past the grooves 37 of the guide rails 35, as shown in FIG. 5.

Figure 9:
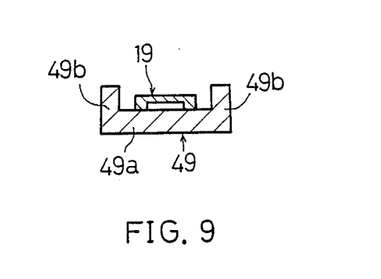
FIG. 9 is a sectional view taken along line IX—IX of FIG. 5.

The strap guiding mechanism 48 is joined to the guide plate 45 of the strap feeding mechanism 44. The task of the strap guiding mechanism 48 is to guide the strap 19 to encircle the bundle W and thence the leading end 27 to be inserted into the aperture 6 of the buckle 2 which has been positioned by the buckle positioning mechanism 38. The strap guiding mechanism 48 includes a lower guide frame 49 and an upper guide frame 50. As shown in FIG. 9, the lower guide frame 49 is formed into a substantially channel-like configuration in cross section having a web 49a and opposite walls 49b. By means of this arrangement, the strap 19 can enter the channel when the bundle W is placed on the lower guide frame 49. Similarly, the upper frame 50 has a web 50a and opposite walls 50b. The guide frames 49 and 50 are connected and bent to form a substantially elliptical configuration. The upper guide frame 50 has one end 53 mounted on the tie guiding mechanism 31 through a support arm 54 pivotally connected thereto, such that the end 53 is disposed above the aperture 6 of the buckle 2 when the buckle 2 is positioned by the buckle positioning mechanism 38.

The strap tightening mechanism 55 is mounted on the upper guide frame 50 adjacent the end 53. Specifically, as shown in FIG. 5, the opposite walls 50b of the upper guide frame 50 are cut out to mount a pair of rollers 56 thereto through rotary shafts 57 driven by a suitable drive. Upon rotation of the rollers 56, tension is applied to the strap 19 to pull it through the aperture 6 of the buckle 2 and tight around the bundle W.

The operation of the cable tie 1 thus constructed will now be described.

Initially, the upper guide frame 50 of the tensioning device 30 is turned upwardly, and a bundle W of wires to be tightened are placed on the lower guide frame 49. Then, the upper guide frame 50 is closed. The strap 19 of the tie 1 is inserted into the grooves 37 of the tie guiding mechanism 31 until the strap 19 is held between the rollers 46 of the strap feeding mechanism 44. Thereafter, when the strap feeding mechanism 44 and the strap tightening mechanism 55 are driven, the strap 19 is fed to the left as indicated by arrows in FIG. 5, and is guided by the guide frames 49 and 50, such that loop is formed around the bundle W. The buckle 2 and the locking leg 12 are fed within the tie guiding mechanism 31 as they are held horizontally along the axis A by means of the connecting portion 20 which may pass between the opposed ledges 36. The buckle 2 is then received between the support surfaces 41 of the buckle positioning mechanism 38, and the fence 11 is engaged by the concave support surfaces 42. The strap feeding mechanism 44 is then stopped. In this position, the leading end 27 of the strap 19 is located in the aperture 6 of the buckle 2. The forward end of the band portion 23 is held between the rollers 56 of the strap tightening mechanism 55, which is in motion after the strap feeding mechanism 44 has been stopped. Thus, the belt 19 is further fed through the aperture 6 until the projections 10 of the engaging member 9 engage the teeth 25. The strap tightening mechanism 55 is stopped as soon as the bundle W is tightened with a predetermined tightening force.

The bundle W thus tightened by the cable tie 1 will be installed to the vehicle body P, as shown in FIG. 4, by inserting the locking leg 12 into the tie mounting hole H.

From the foregoing description, it can be appreciated that the cable tie 1 of the present invention is applicable to the tensioning device 30, as the connecting portion 20 of the strap 19 has the cutout portion 21 which are adapted to pass between the guide rails 35 of the tie guiding mechanism 31. In addition, since the tensioning device 30 is adapted to automate the tightening operation of the tie 1, the bundle W of wires may be tightened both effectively and reliably. Further, the orientation of the locking leg 12 relative to the bundle W may be made constant, thereby facilitating the subsequent wiring operation.

Attention is now directed to FIGS. 10 to 15 which illustrate a cable tie 1A according to a second embodiment. All parts are numbered to correspond to similar parts of FIGS. 1 to 9, and the general description of the parts of FIGS. 1 to 9 are applicable to the corresponding parts of FIGS. 10 to 15.

Figure 10:
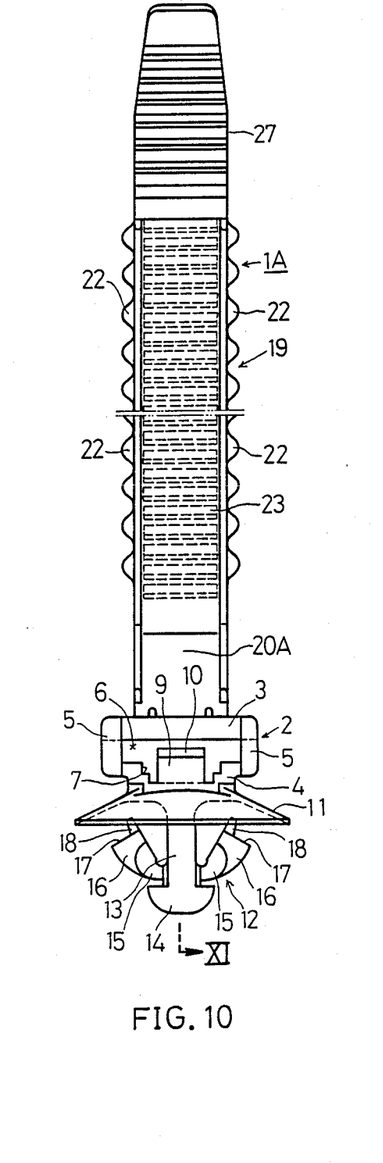
FIG. 10 is a front view of a cable tie according to a second embodiment of the present invention.
Figure 11:
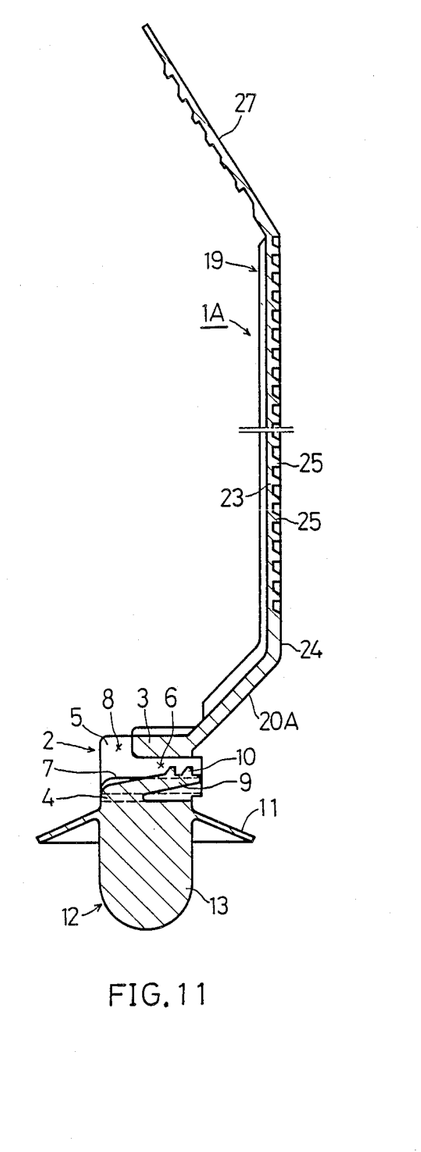
FIG. 11 is a sectional view taken along line XI—XI of FIG. 10.
Figure 12:
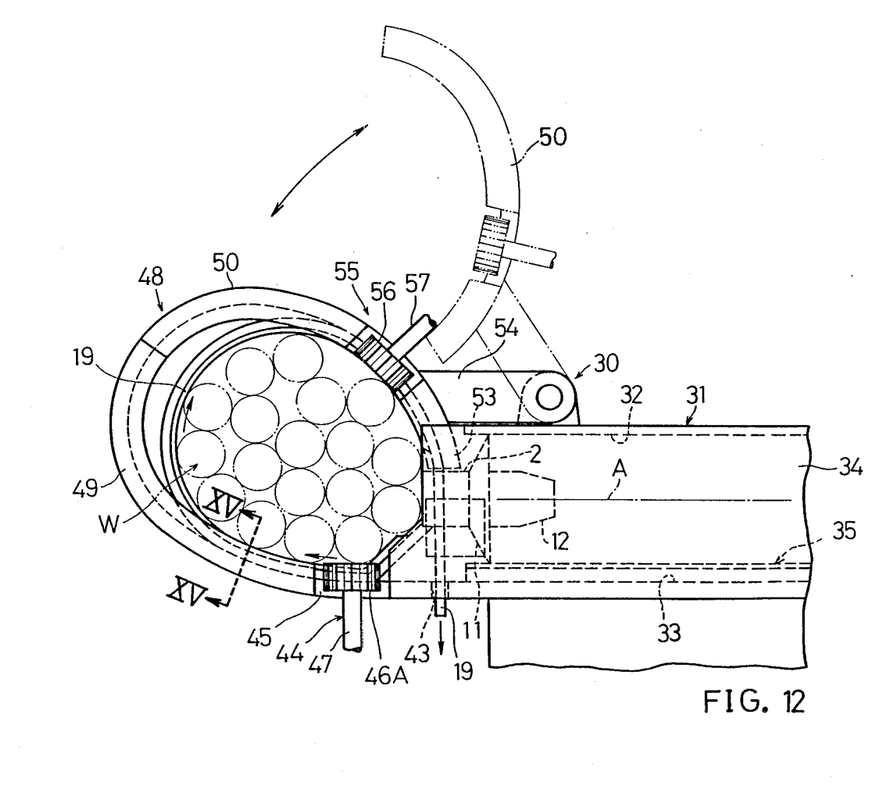
FIG. 12 is a side view of the essential parts of a tie tensioning device to be used with the cable tie of the second embodiment.
Figure 13:
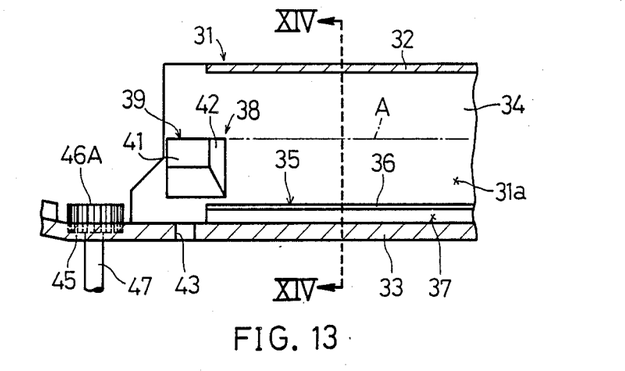
FIG. 13 is a vertical sectional view of the tie guiding mechanism.
Figure 14:
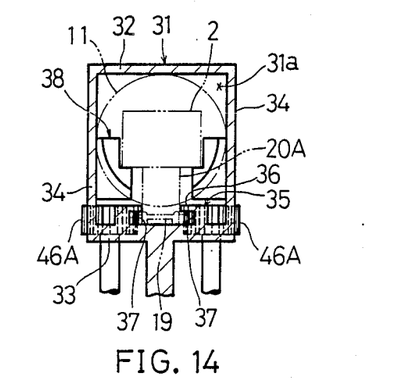
FIG. 14 is a sectional view taken along line XIV—XIV of FIG. 13.

With reference to FIG. 10, the tie 1A of the second embodiment differs from the tie 1 of the first embodiment in the following two points. The first difference is that a plurality of projections 22 are formed on the opposite sides of the band portion 23, as shown in FIG. 10. The projections 22 are configured to engage a pair of rollers 46A of the strap feeding mechanism 44 (FIGS. 13 and 14). The second difference is that the strap 19 has a connecting portion 20A of which the width is identical with that of the band portion 23. However, the connecting portion 20A is not formed with the projections 22 and therefore, the width of the connecting portion 20A is less than the substantial width of the band portion 23 by the height of the projections 22.

Figure 15:
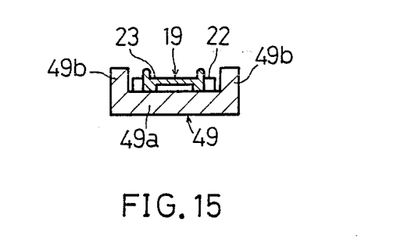
FIG. 15 is a sectional view taken along line XV—XV of FIG. 12.

The tensioning device 30 for the tie 1A of the second embodiment is substantially the same as that of the first embodiment. As with the first embodiment, the strap 19 is inserted into the grooves 37 of the tie guiding mechanism 31. At this time, as shown in FIG. 14, the width of the opening between the ledges 36 is greater than the width of the connecting portion 20A and is less than the combined width of the band portion 23 and the projections 22. For this reason, the projections 22 may be confined by the opposed ledges 36 from upside. The buckle 2 is guided along the guide rails 35 in substantially parallel relation thereto, and the connecting portion 20A is then passed through the opening between the opposed ledges 36. As shown in FIGS. 13 and 14, each of the rollers 46A of the strap feeding mechanism 44 has on the periphery thereof a plurality of teeth which are engageable with the projections 22 of the band portion 23. The cross section of the lower guide frame 49 is substantially the same as that of the first embodiment, except that the distance between the opposite walls 49b is greater than the combined width of the band portion 23 and the projections 22 (FIG. 15).

Figure 16A:
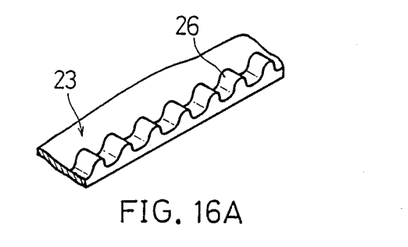
FIGS. 16A and 16B are fragmentary perspective views showing modified forms of projections.
Figure 16B:
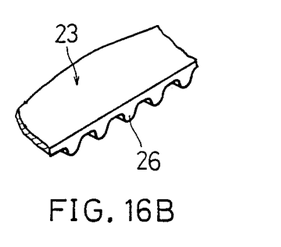

FIGS. 16A and 16B show a modified arrangement of projections. As shown therein, a plurality of projections 26 are formed on the upper surface or the lower surface of the band portion 23 along the opposite edges thereof. To feed this type of straps, the arrangement of rollers of the feeding mechanism 44 has to be changed. For example, when the projections 26 are formed on the lower surface of the band portion 23, the rollers 46A are arranged to engage the lower surface of the strap 19. In this case, the projections 26 may be formed transversely over the entire width of the band portion 23, and a single roller may be used which has a width identical to the transverse extension of the projections 26.

Figure 17:
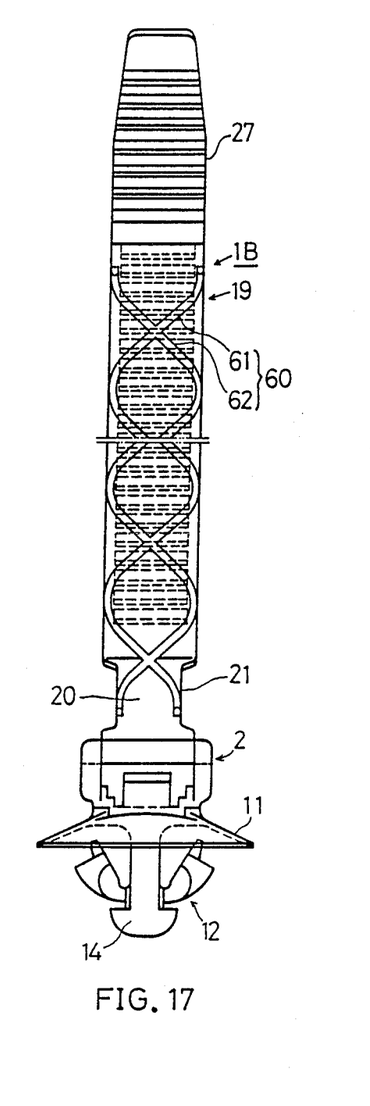
FIG. 17 is a front view of a cable tie according to a third embodiment of the present invention.

FIG. 17 shows a cable tie 1B according to a third embodiment of the present invention. As shown therein, the cable tie 1B includes a plurality of protrusions 60 formed on the strap 19 for preventing slipping movements between the strap 19 and the bundle W of wires. Although the protrusions 60 are formed on the cable tie of the first embodiment, it will be appreciated that the protrusions 60 may be applied also to the cable tie of the second embodiment. All parts are numbered to correspond to similar parts of FIG. 2, and the general description of the parts of FIG. 2 is applicable to the corresponding parts of FIG. 17.

With reference to FIG. 17, the inside surface of the strap 19, which is adapted to engage the periphery of the bundle W of wires, is formed with the protrusions 60 for preventing both longitudinal and circumferential movements of the cable tie 1B relative to the bundle W of wires. In this embodiment, the protrusions 60 include a pair of ridges 61 and 62 formed into a wave-like configuration and extending from the connecting portion 20 to the leading end 27, the ridges 61 and 62 intersecting centrally of the width of the strap 19.

As with the first embodiment, the cable tie 1B is tightened by the tensioning device around the bundle W of wires. With the bundle W tightened by the cable tie 1B, the ridges 61 and 62 are pressed against the periphery of the bundle W, thereby preventing slipping movements of the cable tie 1B in both longitudinal and circumferential directions of the bundle W.

It is to be noted that the slip-preventive protrusions 60 are not limited to the precise form of FIG. 17. Various types of protrusions may be employed as shown in FIGS. 18 to 29.

FIG. 18 shows a protrusion 60A in the form of a single ridge 63 waving substantially over the width of the strap 19.

FIG. 19 shows a plurality of protrusions 60B in the form of a pair of wave-like ridges 64 and 65 formed along the opposite sides of the strap 19, and a series of ring-like ridges 66 formed between the wave-like ridges 64 and 65.

FIG. 20 shows a plurality of protrusions 60C in the form of a pair of wave-like ridges 67 and 68 formed along the opposite sides of the strap 19, and a series of generally V-shaped ridges 69 formed between the wave-like ridges 67 and 68.

FIG. 21 shows a plurality of protrusions 60D in the form of a series of longitudinally spaced-apart wave-like ridges 70.

FIG. 22 shows a plurality of protrusions 60E in the form of a series of arcuate ridges 71 alternately arranged along the opposite sides of the strap 19.

FIG. 23 shows a plurality of protrusions 60F in the form of a series of longitudinally spaced-apart V-shaped ridges 72 extending substantially over the width of the strap 19.

Figure 24:
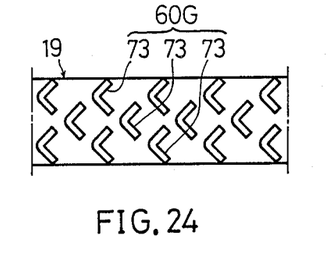

FIG. 24 shows a plurality of protrusions 60G in the form of a series of longitudinally spaced-apart V-shaped ridges 73 of a width substantially half the width of the strap 19.

Figure 25:
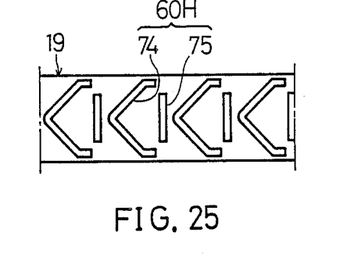

FIG. 25 shows a plurality of protrusions 60H in the form of a combination of longidutinally spaced-apart V-shaped ridges 74 extending substantially over the width of the strap 19, and straight ridges 75 interposed between the V-shaped ridges 74.

Figure 26:
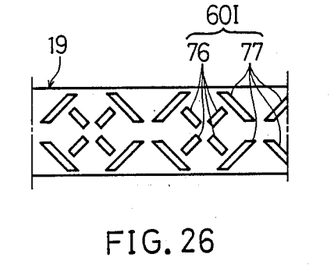

FIG. 26 shows a plurality of protrusions 60I in the form of a series of obliquely directed short and long ridges 76 and 77.

Figure 27:
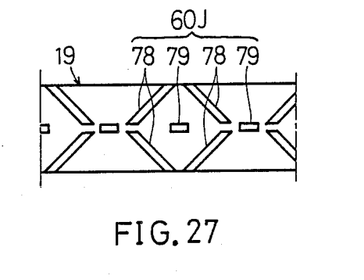

FIG. 27 shows a plurality of protrusions 60J in the form of a combination of obliquely directed ridges 78 and longitudinally spaced-apart parallel short ridges 79 interposed between the obliquely directed ridges 78.

Figure 28:
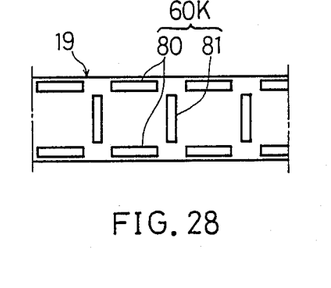

FIG. 28 shows a plurality of protrusions 60K in the form of a combination of transversely spaced-apart pairs of ridges 80 and longidutinally spaced-apart ridges 81.

Figure 29:
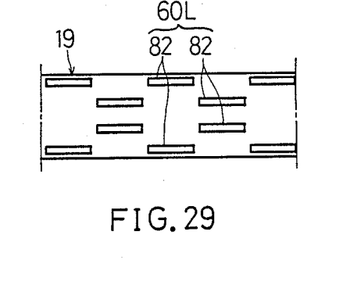

FIG. 29 shows a plurality of protrusions 60L in the form of transversely spaced-apart short ridges 82.

While the invention has been described with reference to preferred embodiments thereof, it is to be understood that modifications or variations may be easily made without departing from the spirit of this invention which is defined by the appended claims.

What is claimed is:

1. A cable tie adapted to be tightened around a bundle of wires or the like by a tensioning device and fixed to a tie mounting hole of a vehicle body or the like, said cable comprising:

a longitudinally elongate strap having opposed surfaces, said strap being flexible and of a substantially fixed length, a series of teeth formed on and extending longitudinally on one surface thereof;

said strap having a longitudinally elongate linearly extending band portion with opposed first and second ends, a strap connecting portion integral with said band portion at said first end, and a strap leading end portion integral with said band portion at said second end;

a buckle integrally connected to said strap connecting portion remote from said band portion, said buckle having means defining an aperture therethrough generally perpendicular to the longitudinal extent of said strap for receiving said strap, a pawl disposed within said aperture and adapted to engage one of said teeth of said strap when said strap is looped around a bundle, and a locking leg integrally connected to said buckle and extending in a direction opposite to the direction in which said strap extends for engagement within a mounting hole;

the improvement wherein, when said cable tie is in a relaxed state prior to engagement around a bundle, said strap connecting portion extends longitudinally beyond and at an angle laterally relative to the longitudinal extent of said strap band portion with said buckle positioned at a predetermined location spaced both laterally and longitudinally from said strap band portion by said connecting portion.

2. The cable tie as defined in claim 1, wherein said strap connecting portion has a width less than that of the remaining portions.

3. The cable tie as defined in claim 1, wherein the connecting portion of said strap has a width equal to that of said strap band portion, and wherein said strap band portion has opposed longitudinal edges with a plurality of spaced-apart projections formed on and extending longitudinally on said side edges, said connecting portion being free of said projections and defining a width less than the combined width of said band portion and said side edge projections thereon.

4. A cable tie adapted to be tightened around a bundle of wires or the like by a tensioning device and fixed to a tie mounting hole of a vehicle body or the like, the tensioning device including a tie guiding mechanism having a pair of spaced-apart strap guide rails, and a strap feeding mechanism having a pair of toothed rollers, said cable tie comprising;

a longitudinally elongate strap formed of synthetic plastic material and having opposed surfaces, said strap being flexible but unstretchable and having a series of teeth formed on and extending longitudinally on one surface thereof which will be outside when the cable tie is tightened around the bundle of wires or the like;

said strap having a longitudinally elongate linearly extending band portion with opposed first and second ends, a strap connecting portion integral with said band portion at said first end, and a strap leading end portion integral with said band portion at said second end;

a buckle of synthetic plastic material integrally connected to said strap connecting portion remote from said band portion, said buckle having means defining an aperture therethrough generally perpendicular to the longitudinal extent of said strap for receiving said strap, a pawl disposed within said aperture and adapted to engage one of said teeth of said strap when said strap is looped around the bundle of wires or the like, and a locking leg integrally connected to said buckle and extending in a direction opposite to the direction in which said strap extends, said locking leg being resiliently engageable with the tie mounting hole of the vehicle body or the like;

the improvement wherein, when said cable tie is in a relaxed state prior to engagement around a bundle, said strap connecting portion extends longitudinally beyond and at an angle laterally relative to the longitudinal extent of said strap band portion with said buckle positioned at a predetermined lateral location spaced from said strap band portion by said connecting portion whereby as said band portion is guided along the strap guide rails of the feed mechanism, said buckle moves along therewith laterally of the guide rails.

5. The cable tie as defined in claim 4, wherein said strap connecting portion has a width less than that of the remaining portions of said strap for lateral extension of said connecting portion between the strap guide rails of the tie guiding mechanism with said remaining portion of said strap slidably, retained in said guide rails.

6. The cable tie as defined in claim 4, wherein the connecting portion of said strap has a width equal to that of said strap band portion, and wherein said strap band portion has opposed longitudinal edges with a plurality of spacedapart projections formed on and extending longitudinally on said side edges for engagement by the toothed rollers of the strap feeding mechanism, said connecting portion being free of said projections and defining a width less than the combined width of said band portion and said side edge projections thereon.

* * * * *